United States Patent

Guenther et al.

[11] Patent Number: 6,062,082
[45] Date of Patent: May 16, 2000

[54] MICROMECHANICAL ACCELERATION OR CORIOLIS ROTATION-RATE SENSOR

[75] Inventors: Gero Guenther, Hannover; Karsten Funk; Franz Laermer, both of Stuttgart; Andrea Schilp, Schwaebisch Gmuend, all of Germany

[73] Assignee: Robert Bosch GmbH, Stuttgart, Germany

[21] Appl. No.: 08/913,598

[22] PCT Filed: Feb. 17, 1996

[86] PCT No.: PCT/DE96/00248

§ 371 Date: Sep. 18, 1997

§ 102(e) Date: Sep. 18, 1997

[87] PCT Pub. No.: WO97/02467

PCT Pub. Date: Jan. 23, 1997

[30] Foreign Application Priority Data

Jun. 30, 1995 [DE] Germany ............... 195 23 895

[51] Int. Cl.⁷ .................. G01P 15/08; G01P 9/04
[52] U.S. Cl. .................. 73/514.16; 73/514.38; 73/504.03; 73/504.12
[58] Field of Search .................. 73/504.08, 504.03, 73/504.04, 504.12, 514.29, 514.37, 514.38, 514.32, 514.16; 310/308, 309, 338

[56] References Cited

U.S. PATENT DOCUMENTS

| 5,329,815 | 7/1994 | Dunn et al. | 73/504.12 |
| 5,349,855 | 9/1994 | Bernstein et al. | 73/504.16 |
| 5,377,544 | 1/1995 | Dunn | 73/504.08 |
| 5,635,639 | 6/1997 | Greiff et al. | 73/504.04 |
| 5,635,640 | 6/1997 | Geen | 73/504.12 |
| 5,806,365 | 9/1998 | Zunino et al. | 73/504.03 |
| 5,889,207 | 3/1999 | Lutz | 73/504.12 |

FOREIGN PATENT DOCUMENTS 0 623 807   11/1994   European Pat. Off.

Primary Examiner—Hezron E. Williams
Assistant Examiner—Helen C. Kwok
Attorney, Agent, or Firm—Venable; George H. Spencer; Norman N. Kunitz

[57] ABSTRACT

An acceleration sensor, particularly a Coriolis rotation-rate sensor, having a swinging structure that is movably suspended on a substrate (base) and can be deflected due to an acceleration effect, the sensor further having an arrangement for generating a planar swinging movement of the swinging structure, particularly a rotational swinging movement, and an evaluating arrangement for detecting a deflection of the swinging structure that is stipulated by acceleration, particularly for detecting a Coriolis acceleration. The swinging structure (12) is rotatably suspended so as to perform a planar swinging movement, and should perform a planar, rotational swinging movement.

20 Claims, 2 Drawing Sheets

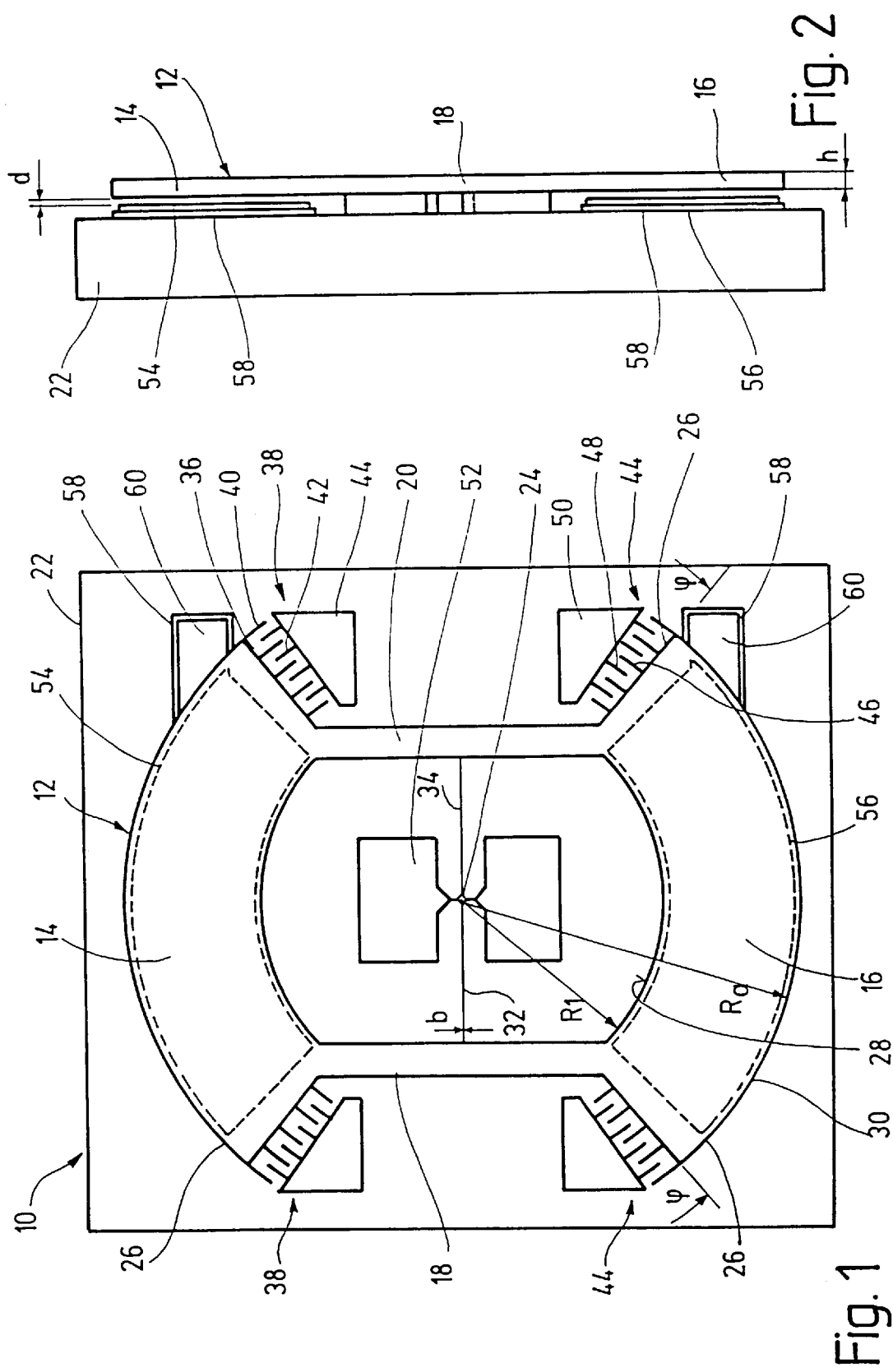

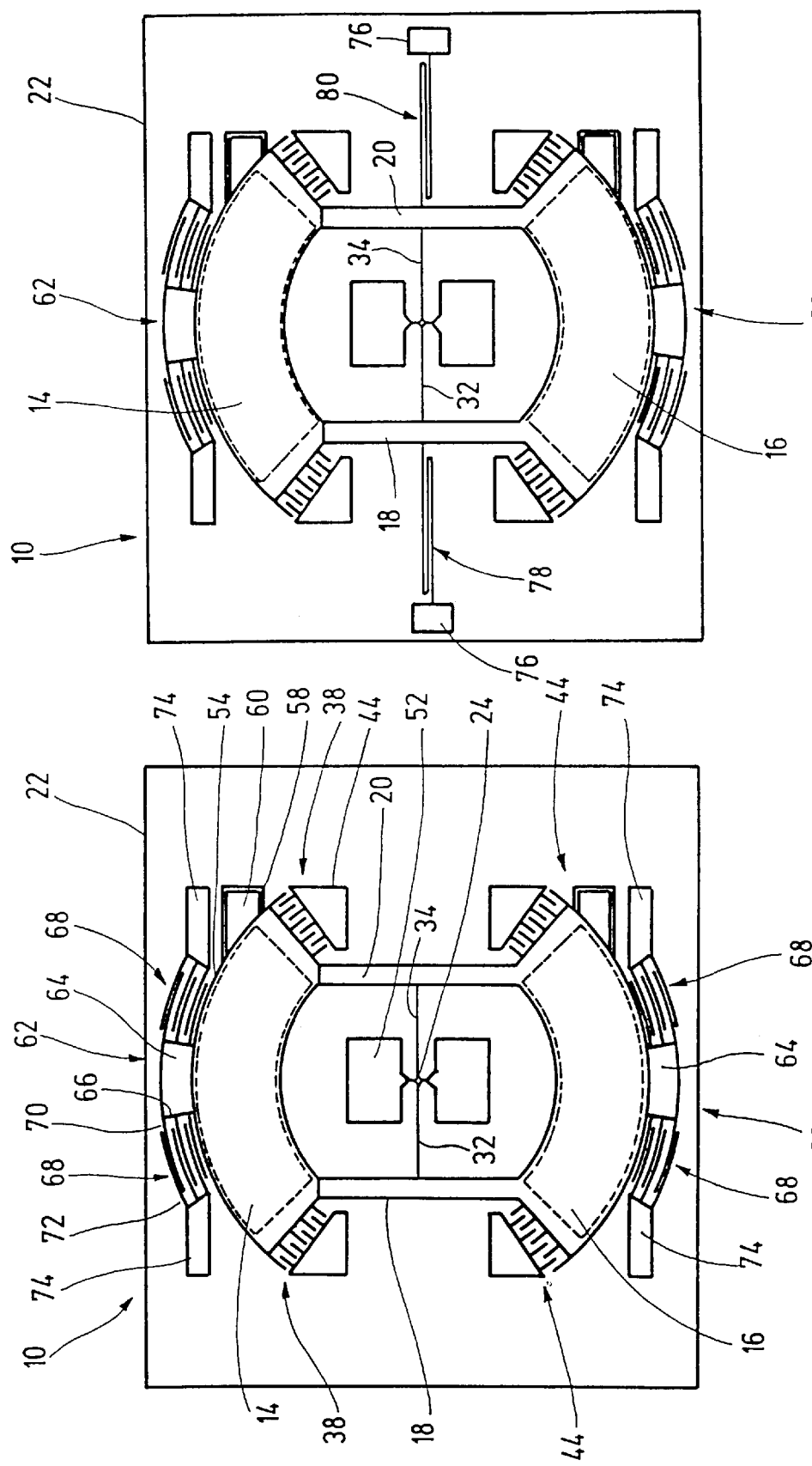

MICROMECHANICAL ACCELERATION OR CORIOLIS ROTATION-RATE SENSOR

BACKGROUND OF THE INVENTION

The invention relates to an acceleration sensor, particularly a Coriolis rotation-rate sensor, having a substrate (base) that has a bearing point, a swinging structure rotatably suspended at the bearing point for executing a planar swinging movement, means for generating a planar swinging movement of the swinging structure, and evaluating means for detecting an acceleration-stipulated deflection of the swinging structure, particularly for detecting a Coriolis acceleration.

RELATED ART

Acceleration sensors configured as Coriolis rotation rate sensors are known. These sensors have, for example, structures that swing in a plane and are configured as seismic masses. Suitable drive devices subject these structures to a periodic linear movement in the plane. If a Coriolis acceleration acts on this structure swinging in the plane, the structure is deflected out of the swinging plane. This means that the structure must be suspended to be soft in two degrees of freedom, first for the planar swinging and secondly for the detection of the Coriolis acceleration. Because of disturbing movements and disturbing accelerations that occur during the detection of the Coriolis acceleration, for example in a vehicle, and that are superimposed over the deflecting movement of the structure out of the plane, the detection of the Coriolis acceleration must be effected selectively. To this end, it is known to condition the signal courses measured by means of the Coriolis rotation-rate sensors through frequency-sensitive and phase-sensitive synchronous demodulation such that the signal components proportional to the Coriolis acceleration can be distinguished and filtered out, namely with the proper frequency and phase position.

According to in-house related art, it is known to mechanically suppress interfering accelerations acting on the Coriolis rotation rate sensor. For this purpose, the swinging structure is formed by two swinging masses that swing in opposite directions with respect to one another. The opposing direction of movement of the swinging masses causes a Coriolis acceleration in opposite directions, which effects a torque at the location of the fastening shaft, and thus results in a rocking movement of the entire structure if the axis of the rotation rate to be measured extends perpendicular to the direction of planar swinging of the swinging structure. For effecting the swinging of the two swinging masses in opposite directions, they are connected to one another by a costly coupling structure. The disadvantages of this are:

- that the complexity of the sensor is increased by the coupling structure;
- that the process becomes more difficult, and the yields decrease;
- that additional swinging modes are enabled, increasing susceptibility to disturbances;
- that simulation and calculation become more difficult, and
- that the possibility exists of phase and amplitude errors between the masses swinging in opposite directions.

These disadvantages have a negative effect on the measured signal.

SUMMARY AND ADVANTAGES OF THE INVENTION

The above problems are essentially solved by an acceleration sensor, particularly a Coriolis rotation-rate sensor according to the invention which has: a substrate (base) that has a bearing point; a swinging structure rotatably suspended at the bearing point for executing a planar swinging movement; means for generating the planar swinging movement of the swinging structure; and evaluating means for detecting an acceleration-stipulated deflection of the swinging structure, particularly for detecting a Coriolis acceleration; and wherein the swinging structure is connected to the bearing point springs extending in a radial direction from the bearing point, and the springs have a large height (h) in relation to their width (b), so interfering accelerations can already be mechanically suppressed directly at the acceleration sensor.

In contrast to the know acceleration sensors with the problems discussed above, the acceleration sensor of the invention, as described above offers the advantage that a precise detection of a Coriolis acceleration can be effected in a simple manner, and is essentially not influenced by the above-mentioned signal errors. Because a swinging structure that is rigid in and of itself is rotatably suspended, without intrinsic mobility, for executing the planar swinging movement, the tangential component is always automatically in the opposite direction of the circumferential speed of points located opposite the point of rotation of the swinging structure. Consequently, amplitude and/or phase errors cannot occur, as in coupled linear swinging bodies. The springs that support the rigid rotating pendulum must be soft for the rotating swinging, and also for the rocking movement stipulated by the rotation rate, in order to permit low natural frequencies and relatively large deflections. In contrast, for disturbing, external linear accelerations, the structure must be as rigid as possible so the accelerations can be mechanically discriminated at the manufacturing site. This can be achieved with springs having a high aspect ratio, that is, those which are relatively narrow with a relatively large height. These springs are soft enough to bend in the plane, and permit low-frequency rotational swinging with a high amplitude; the out-of-plane torsional resistance is also low, so large detection signals can be generated. In contrast, as stipulated by the large height, the out-of-plane bending resistance is very high, so out-of-plane disturbing accelerations can be suppressed very well. External, lateral disturbing accelerations can also be effectively suppressed if these springs are relatively short: Then rotational swinging and rocking movements act on the springs via a long, mechanical lever, while no such lever is provided for intensifying linear accelerations. While the spring arrangement reacts softly to effect the desired movements, it is hard with respect to disturbing accelerations in the plane and "out-of-plane," so these disturbing accelerations can only effect small deflections.

A rotating swinging body has a periodic-swinging rotational momentum. If this structure is rotated by an external source, periodic-swinging moments that correspond to Coriolis accelerations occur due to the attainment of the rotational momentum.

Rotational swinging of a rigid structure=periodic-swinging rotational momentum L=$L_0$ sin $\omega t$ external rotation $\Omega \rightarrow$ periodic change in rotational momentum $\rightarrow$ periodic torque M at the fastening shaft (="Coriolis acceleration"):

$$M = \frac{dL}{dt} = \Omega L = \Omega L_0 \sin \omega t$$

periodic torque M=$\Omega L_0$ sin $\omega t \rightarrow$ rocking movement about fastening shaft If such Coriolis accelerations act on the acceleration sensor, the swinging structure executing the planar rotational swinging is rotated about its fastening shaft, and the planar rotational swinging transitions into a rotational rocking swinging. Consequently, the swinging structure is deflected out of the plane on one side, and into the plane by way of the point of rotation on the opposite side, or vice versa. The change in distance between the swinging structure and the base that is caused by this rotational rocking movement can preferably be detected capacitively to obtain a signal that is proportional to the Coriolis acceleration. The acceleration sensor has an overall very simple, extremely sturdy and inexpensive design. The acceleration sensor is structured in accordance with surface micromechanics methods, and thus obtains a structure that permits highly-precise and therefore very exact measurements.

In a preferred embodiment of the invention, it is provided that electrodes that yield a capacitive evaluation means with the swinging masses, and that serve in detecting a rotation-rate-stipulated rocking movement (out-of-plane) of the structure, are disposed beneath the swinging masses. The electrodes respectively disposed beneath a swinging mass advantageously have a smaller surface than the respective swinging mass. Because of this, the electrodes remain completely beneath the respective swinging mass at all times during the planar rotational movement of the swinging structure. This prevents even an only temporary influence of the capacitance due to the planar rotational swinging, and a detection of a variation in capacitance can be attributed exclusively to the see-saw movement (rocking movement) of the swinging structure caused by a Coriolis acceleration. To detect the rocking movement stipulated by the rotational rate, an electronic position regulation can advantageously be used to designate the frequency of the detection mode electronically above that of the rotational swinging mode (insofar as this has not already been realized with suitable design measures). The electronic position regulation achieves this through a dynamic reinforcement of the rocking mode using electronic counterforces.

In a further embodiment of the invention, it is provided that the acceleration sensor is laid out in the preferred direction for linear accelerations in addition to the direction for rotation rates. The springs supporting the swinging structures are to be designed such that they are soft for a linear, lateral movement in a preferred direction in the plane, in addition to the rotational movement and the out-of-plane torsional movement. This is achieved by a suitable selection of the length-height ratio of these springs. To this end, an additional position regulation, which is preferably formed by diametrically-opposite comb structures disposed on the outsides of the swinging masses that form the swinging structure, is associated with the swinging structure. This advantageously permits a dual function of the acceleration sensor, namely detecting a Coriolis acceleration and detecting a linear acceleration. The linear acceleration acting on the swinging structure effects a defined change in the electronic position regulation, which can advantageously be measured by a change in capacitances due to the changes in distances of the swinging structure from fixed capacitances caused by the linear accelerations. This change in distance can advantageously be detected with a suitable position-regulation electronics known per se, and maintained electrostatically at zero. The electrical signal used for the position regulation of the swinging structure simultaneously yields information about the magnitude of the linear accelerations acting on the swinging structure.

Further advantageous embodiments of the invention ensue from the other features listed in the dependent claims.

BRIEF DESCRIPTION OF THE DRAWINGS

The invention is described in detail below by way of embodiments in conjunction with the attached drawings wherein:

FIG. 1 is a plan view of a rotation-rate sensor;

FIG. 2 is a schematic section through the rotation-rate sensor according to FIG. 1;

FIG. 3 is a plan view of a rotation-rate sensor according to a second embodiment; and, FIG. 4 is a plan view of a rotation-rate sensor according to a third embodiment.

DETAILED DESCRIPTION OF THE PREFERRED EMBODIMENTS

FIG. 1 shows a rotation-rate sensor indicated generally by 10. The rotation-rate sensor 10 includes a swinging structure 12, which has two swinging masses 14 and 16. The swinging masses 12 and 14 are rigidly coupled to one another by way of webs 18 and 20, and form a rotating pendulum. The swinging structure 16 is suspended to float on a substrate (base) 22. To this end, a bearing point 24 is provided that coincides with the mass center point of the swinging structure 12. The swinging masses 14 and 16 are disposed exactly symmetrically and mirror-symmetrically with respect to the bearing point 24. When the swinging structure 12 rests on the bearing point 24, the structure is thus in a suspended state, and is supported solely by the bearing point 24. The swinging masses 14 and 16 and the webs 18 and 20 are formed in one piece, and are structured, for example, in accordance with methods of surface micromechanics from a polysilicon material. The swinging structure 12 has an overall height h (FIG. 2) and is spaced and electrically insulated from the substrate by the bearing point 24.

The swinging masses 14 and 16 are respectively formed by a cylinder section 26, which has a circle-sector cutout surface in plan view. The cylinder section 26 has an inner circumference 28 and an outer circumference 30. The inner circumference 28 extends as a circular line around the bearing point 24 with a radius $R_i$. The outer circumference 30 likewise extends as a circular line around the bearing point 24, with a radius $R_a$. The cylinder sections 26 of the swinging masses 14 or 16 extend at an angle $\phi$. In this arrangement, the center point of the swinging masses 14 or 16 coincides with the bearing point 24.

The swinging structure 12 is suspended at the bearing point 24 by means of springs 32 or 34 extending from the webs 18 or 20. The springs 32 or 34 have a high aspect ratio, that is, they are very narrow in relation to their height h, which corresponds to the height h of the swinging structure 12. Seen in plan view, a width b of the springs 32 or 34 is therefore very small. This high aspect ratio of the springs is important for significant suppression of external disturbing accelerations with respect to the Coriolis accelerations to be measured.

Comb structures are respectively associated with the end faces 36 of the swinging masses 14 or 16, the faces extending on a radius. Associated with the swinging mass 14 are comb structures 38, which comprise a comb 40 that is connected to the swinging mass 14 and thus moves with it, and a comb 42 that meshes with the comb 40 and is fixedly disposed on the substrate 22. The comb 42 is connected by way of a contact 44, only indicated, to a circuit arrangement, not shown here. The swinging mass 14 has the comb structure 38 on both sides. The swinging mass 16 has on its end faces 36 a comb structure 44, which has a comb 46 that is fixedly connected to the swinging mass 16, and a comb 48 that is fixedly disposed on the substrate 22 and meshes with the comb 46. The comb 48 is likewise connected to the circuit arrangement by way of a contact 50. The swinging structure 12, and thus the combs 40 or 46 movably attached to the swinging structure 12, are connected to the circuit arrangement by way of a ground contact 52, which permits a contacting via the bearing point 24, the springs 32 or 34, the webs 18 or 20 and the swinging masses 14 or 16. The ground contact 52 is likewise disposed on the substrate 22, and is connected with suitable electrical insulation. All of the structures are electrically insulated from the substrate by an intermediate oxide, or separated electrically from one another by pn transitions or junction in the substrate (depending on the connecting technique).

An electrode 54 or 56 is respectively disposed on the substrate 22, beneath the swinging masses 14 or 16. The electrodes 54 and 56 are disposed on the substrate 22 above an insulation layer, for example a silicon oxide 58. In plan view, the electrodes 54 or 56 are adapted in contour to the swinging masses 14 or 16, but have a smaller circle-sector cutout surface. In other words, the inner radius of the electrodes 54 or 56 is greater than the inner radius $R_i$ of the swinging masses 14 or 16, and the outer radius of the electrodes 54 or 56 is smaller than the outer radius $R_a$ of the swinging masses 14 and 16. Moreover, an angle φ—not shown here—of the electrodes 54 and 56 is smaller than the angle φ of the swinging masses 14 or 16. The electrodes 54 and 56 are respectively led out by way of a contact 60, and are connected to the circuit arrangement that is not shown. As becomes apparent from FIG. 2, in which the other parts identical to those in FIG. 1 are provided with the same reference characters and are not explained again, the electrodes 54 or 56 are disposed with spacing d beneath the swinging masses 14 or 16. Thus, no direct contact exists between the electrodes 54 and 56 and the swinging masses 14 and 16, and they are electrically insulated completely from one another.

The rotation-rate sensor 10 shown in FIGS. 1 and 2 functions as follows:

The comb structures 38, acting as electrostatic comb drives, set the swinging structure 12 into a planar rotational swinging about the bearing point 24. The swinging structure 12 thus executes a planar (in-plane) torsional swinging about the bearing point 24. The comb structures 44 attached to the swinging mass 16 form a capacitive swinging tap for the torsional swinging of the swinging structure 12, and can be used for amplitude stabilization of the torsional swinging and electronic feedback for attenuation equalization of the torsional swinging. Therefore, in the initial state of the rotation-rate sensor 10, the swinging structure 12 performs a uniform, planar torsional swinging about the bearing point 24. The springs 32 and 34 having a high aspect ratio are soft with respect to this planar torsion as well as with respect to the out-of-plane torsion, a consequence of which is relatively low natural frequencies of the corresponding modes. In contrast, for external disturbing accelerations, they are hard, so the accelerations can be suppressed at the manufacturing site. Because the electrodes 54 and 56 have smaller dimensions than the swinging masses 14 and 16, they remain permanently beneath the swinging masses 14 or 16, even during the planar torsional swinging of the swinging structure 12. Consequently, no capacitance variation that would lead to a change in the signal results between the electrodes 54 and 56 or the swinging masses 14 and 16 due to the torsional swinging.

With the occurrence of a Coriolis acceleration, the swinging structure 12 performing a planar torsional swinging about the bearing point 24 rotates periodically about the fastening shaft. Consequently, the planar torsional swinging of the swinging structure 12 transitions into a rotational rocking swinging. Thus, in addition, an out-of-plane swinging of the swinging structure 12 takes place. A result of this out-of-plane swinging is a change in the distance between the swinging masses 14 or 16 and the electrodes 54 and 56, respectively, disposed beneath them. This change in distance can be detected capacitively by way of the electrodes 54 or 56 and the swinging masses 14 or 16 contacted with the ground contact 52. Because of the out-of-plane swinging, the distance between, for example, the swinging mass 14 and the electrode 54 is reduced, while the distance between the swinging mass 16 and the electrode 56 increases simultaneously. In the opposite swinging direction, the distance between the swinging mass 16 and the electrode 56 is reduced, while the distance between the swinging mass 14 and the electrode 54 increases. The capacitance between the swinging masses 14 or 16 and the electrodes 54 or 56 thereby increases or drops periodically. By means of the contacts 60, this variation in capacitance can be evaluated with the circuit arrangement that is not shown, and which includes a position regulation and a signal proportional to the variation in capacitance, for example the position-regulation voltage, and that yields a measure for the Coriolis acceleration acting on the rotation-rate sensor 10 is transmitted.

Hence, a rotation-rate sensor 10 is created that has an overall simple design and can be manufactured, through surface-micromechanics steps that are easy to master, in a single-layer design on silicon substrates. The contacts and electrodes of the rotation-rate sensor 10 can be achieved with polysilicon-precipitation method steps (buried polysilicon layer) or doping ("buried-layer" connecting technique), which are likewise easy to master. The rotation-rate sensor 10 can therefore be manufactured with simple method steps in a manner suited for mass production, has a simple design and is extremely sturdy.

In the function of the rotation-rate sensor 10, the one point that must be kept in mind is that the resulting natural frequency of the out-of-plane detection swinging is higher than that of the planar torsional swinging, so that the rocking movement, which occurs at the frequency of the torsional swinging due to the Coriolis acceleration, is not designated in the range of resonance step-up, and therefore not in the range of post-pulse oscillations that are difficult to control. To this end, a position regulation, preferably having PD characteristics, can preferably be used to electrically reinforce the out-of-plane torsion mode through electrostatic forces. Another possibility is a suitable change in the design of the rotation-rate sensor so that the natural frequency of the torsion in the plane is lower than the natural frequency of the out-of-plane torsion (detection mode). The springs 32 or 34 can advantageously be fastened to the swinging masses 14 or 16 instead of to the holding webs 18 or 20. By means of evacuation or compression, an ideal damping of $1/\sqrt{2}$, which extensively effects a constant amplitude almost up to the natural frequency with a subsequent drop of 20 dB per frequency decade, can be set to suppress the above-described, uncontrollable post-pulse oscillations.

The relationships in the detection of Coriolis accelerations by means of the rotation-rate sensor 10 are clarified below by way of a calculation example. In this calculation example, the masses of the webs 18 or 20 were disregarded for the sake of simplicity. Only one swinging mass 14 or 16 and one spring 32 or 34 were used in the calculation, because the factor of 2 is reduced again (in calculation with both swinging masses 14 and 16 and both springs 32 and 34) in relation to the following formulas.
Calculation of the Natural Frequencies
Natural frequency with general torsion:

$$\omega = \sqrt{\frac{C_{tor}}{J}}$$

where the following relationship applies:

$M = C_{tor} \cdot \tan \Theta$

Natural frequency with linear swinging:

$$\omega = \sqrt{\frac{C_{Lin}}{m}}$$

where the following relationship applies:

$F = C_{Lin} \cdot \eta$

Rotational swinging:
Spring resistance to rotation (crosspieces fixedly clamped on one side, bent):

$$C_{rot} = \frac{EI}{l_i}$$

with $$I = \frac{1}{12} b^3 \cdot h$$

Mass moment of inertia:

$$J = \frac{1}{2} \pi \zeta h \frac{\phi}{360°} (R_a^4 - R_i^4)$$

Rocking swinging:
Spring resistance to torsion (crosspieces fixedly clamped on one side, rotated):

$$C_{Tors} = \frac{G I_0^*}{l_i}$$

with $$I_0^* = \frac{1}{3} \left( \frac{h}{b} - 0.63 \right) b^4$$

for h/b>4 and $$G = \frac{E}{2.44}$$

for silicon
Mass moment of inertia:

$$J = \frac{1}{4} \zeta h (R_a^4 - R_i^4) \left( \frac{\phi}{2} + \frac{1}{2} \sin\phi \right)$$

Linear acceleration along the axis of mass center of gravity center point:
Spring resistance to bending (crosspiece fixedly clamped on both sides, bent):

$$C_{Lin} = \frac{12 E I}{l_i^3}$$

Mass:

$$m = \pi \zeta h \frac{\phi}{360°} (R_a^2 - R_i^2)$$

Calculation of Sensitivity
The calculation is effected for one side, because a total of two masses operates counter to two torsion springs. The mass corresponds to the above formulas;
Circumferential speed:

$V = 1_s \omega \sin \Theta$

Moment of momentum:

$L_0 = 1_s \times vm$

Periodic-swinging moment of momentum:

$L = L_0 \sin \omega t$

Moment:

$$M = \frac{dL}{dt} = \Omega L + \Omega L_0 \sin \omega t$$

Angle of rotation:

$$\alpha = \frac{M l_i}{G I_0^*}$$

Deflection:

$z = R \cdot \sin \alpha$

In accordance with a concrete embodiment, the point of departure is the following dimensioning of the rotation-rate sensor 10.

Angle of circle-sector cutout: $\phi = 80°$
Deflection: $\Theta = 5°$
Structure height: h=12 µm
Crosspiece height: b=2 µm
Crosspiece length: 1=200 µm
Outer edge of structure: $R_a$=600 µm
Inner edge of structure: $R_i$=380 µm
Electrode spacing: d=1.2 µm
Rotational swinging frequency: $\omega = 3000 s^{-1}$
The following values result at a rate of rotation of 1°/s (=0.017 rad/s (=0.017 rad/s):

| | |
|---|---|
| max. torque | L = 2.34*10$^{-13}$ Nm |
| max. rocking angle | $\alpha$ = 1.23*10$^{-6}$ rad |
| max. deflection (inner/outer) | z = 0.47 nm/0.74 nm |
| base capacitance | $C_0$ = 0.31232 pF |
| $\phi$ capacitance variation | $\Delta C$ = 0.15 fF |
| capacitance ratio | $\Delta C/C_0$ = 1/2000 |

FIGS. 3 and 4 show further embodiments for a rotation-rate sensor 10. Parts identical to those in FIG. 1 are provided with the same reference characters, and are not explained again. The description of the design and function only focuses on the differences from FIG. 1.

The rotation-rate sensor 10 shown in FIG. 3 has a lateral electronic position regulation 62 in the plane of the swinging movement. The position regulation 62 includes a section 64 that is disposed at the outer circumference 30 of the swinging masses 14 or 16, with a comb structure 68 being disposed at end faces 66 extending radially with respect to the bearing point 24. The comb structure 68 has combs 70 that are connected to the section 64, and thus move with it, and mesh with the combs 72 fixedly disposed on the substrate 22. The individual fingers of the combs 70 or 72 have an arc-shaped extension on an imaginary circular line around the bearing point 24. The combs 72 are connected by way of a contact 74 to a circuit arrangement, not shown. The swinging mass 14 and the swinging mass 16 respectively have a diametrically-opposite position regulation 62; the arrangement is selected so as not to interfere with the exact mirror-symmetrical design of the swinging structure 12.

The function of the position regulation 62 is as follows:

In the intended use of the rotation-rate sensor 10, the sensor is typically exposed to a linear acceleration in addition to the Coriolis acceleration to be detected. Because the suspension of the swinging structure 12 must be soft for the planar torsional swinging and the rocking swinging caused by the Coriolis acceleration, the suspension is also not infinitely rigid for a linear acceleration acting perpendicular to the axis of rotation of the rotation rate that effects the Coriolis acceleration. This linear acceleration causes a slight deflection of the swinging structure 12 in the direction in which the linear acceleration acts. The deflection due to the effect of a linear acceleration is, however, completely suppressed by means of the position regulations 62 disposed on the swinging masses 14 or 16. When a linear acceleration is in effect, a change in capacitance occurs between the combs 70 and the combs 72 of the comb structures 68. This change in capacitance occurs because of the deflection of the swinging structure 12, since the distance between the combs 70 or 72 changes slightly. Because of the change in capacitance, an electronic signal is obtained that provides a variable for the effective linear acceleration. A corresponding countersignal is generated by way of the circuit arrangement that is not shown, and maintains the change in distance between the combs 70 and 72 electrostatically at zero. The position-regulation signal varies depending on the magnitude of the deflection caused by the linear acceleration. In addition to indicating the exact position regulation of the swinging structure 12, the signal obtained by means of the position regulation 62 simultaneously gives information about the magnitude of the linear acceleration acting on the swinging structure 12. Hence, the sensor can simultaneously be used both as a Coriolis rotation-rate sensor and a linear-acceleration sensor.

The arc-shaped arrangement of the combs 70 or 72 prevents a change in capacitance between the combs 70 or 72 due to the planar torsional swinging of the swinging structure 62. The loss of surface on the one side of the position regulation 62 that occurs because of the torsional swinging is compensated by an increase in surface of equal magnitude on the other side of the position regulation 62. It is assumed here that the combs 70 or 72 have an identical radius, and that the respective facing surfaces of the combs 70 and 72 have a slight surface roughness.

In the embodiment variation shown in FIG. 4, the swinging masses 14 or 16 of the swinging structure 12 are contacted by an external ground contact 76. As a result, the bearing point 24 is only used for the rotatable seating of the swinging structure 12, and need not take over an electrical coupling function for the swinging structure 12. The swinging structure 12 is connected by means of springs 78 or 80 that are extremely soft in the planar swinging plane of the swinging structure 12. The springs 78 and 80 contact the ground contact 76 in the center with the webs 78 or 80 that connect the swinging masses 14 and 16. Because the springs 78 or 80 are extremely soft in the planar swinging plane, the planar torsional swinging of the swinging structure 12 is only insignificantly influenced, so the springs 78 and 80 have a negligible influence on the swinging behavior of the swinging structure 12.

Other advantageous connection options ensue from the utilization of the lower contact plane, in which the counter-electrodes for the capacitive detection of the out-of-plane rocking swinging are also configured. Both the capacitor surfaces and contact paths for electrical connection of the sensor elements can be configured in this lower plane. A buried layer of polysilicon or diffused surfaces and contact paths ("buried layer") can also be used.

We claim:

1. Acceleration sensor, particularly a Coriolis rotation-rate sensor, having
   a substrate (22) (base) that has a bearing point (24),
   a swinging structure (14, 16, 18, 20) rotatably suspended at the bearing point (24) for executing a planar swinging movement,
   means for generating the planar swinging movement of the swinging structure, and
   evaluating means for detecting an acceleration-stipulated deflection of the swinging structure, particularly for detecting a Coriolis acceleration; and wherein the swinging structure (14, 16, 18, 20) is connected to the bearing point (24) by springs (32, 34) extending on a radius from the bearing point (24), and the springs (32, 34) have a large height (h) in relation to their width (b), so interfering accelerations can already be mechanically suppressed directly at the acceleration sensor (10).

2. Acceleration sensor according to claim 1, wherein the swinging structure (12) is formed by two swinging masses (14, 16) disposed rotation-symmetrically with respect to the bearing point (24), with the masses being rigidly coupled to one another by webs (18, 20).

3. Acceleration sensor according to claim 2, wherein the swinging masses (14, 16) are respectively formed by a cylinder section (26) whose outer circumference (30) and inner circumference (28) have a radius ($R_a$, $R_i$) that extends around the bearing point (24).

4. Acceleration sensor according to claim 2, wherein the webs (18, 20) that connect the swinging masses (14, 16) are respectively connected to the bearing point (24) by a respective said spring (32, 34) extending on a radius of the swinging structure (12).

5. Acceleration sensor according to claim 2, wherein the swinging masses (14, 16) have an electrostatic comb drive (38).

6. Acceleration sensor according to claim 5, wherein the comb drive (38) has movable combs (40) that are disposed at end faces (36) of the swinging masses (14, 16) oriented in the circumferential direction of the swinging structure (12), with the combs meshing with combs (42) that are fixedly disposed on the substrate (22).

7. Acceleration sensor according to claim 2 wherein the swinging structure (12) has a total of four comb structures (38, 44), of which two are connected as an electrostatic comb drive (38) and two are connected as a capacitive read out (44).

8. Acceleration sensor according to claim 2, wherein an electronic position regulation (62) acting in the plane of the swinging movement, that is, laterally, is associated with the swinging structure (12).

9. Acceleration sensor according to claim 8, wherein the electronic position regulation (62) is formed by diametrically-opposite comb structures (68) disposed at outer circumferences (30) of the swinging masses (14, 16).

10. Acceleration sensor according to claim 2, wherein electrodes (54, 56) are disposed beneath the swinging masses (14, 16), with the electrodes forming a capacitive evaluation means with the swinging masses (14, 16) and serving in the detection of a see-saw movement (out-of-plane) of the swinging structure (12) that is stipulated by a rotation rate.

11. Acceleration sensor according to claim 10, wherein an electronic position regulation is used to detect the see-saw movement.

12. Acceleration sensor according to claim 1, wherein a natural frequency of out-of-plane torsional swinging (detection mode) already lies above a natural frequency of the torsion in the plane of the swinging movement due to suitable mechanical fastening of the springs (32, 34) to the swinging structure (12).

13. Acceleration sensor according to claim 10, wherein the electrode (54, 56) respectively disposed beneath a swinging mass (14, 16) has a smaller circle-segment surface than the swinging mass (14, 16).

14. Acceleration sensor according to claim 2, wherein the swinging masses (14, 16) are electrically contacted via the bearing point (24).

15. Acceleration sensor according to claim 2, wherein the swinging masses (14, 16) are electrically contacted by contact connections acting externally on the webs (18, 20).

16. Acceleration sensor according to claim 15, wherein the contact connections are formed by extremely-soft springs (78, 80) disposed in the planar swinging plane of the swinging structure (12).

17. Acceleration sensor according to claim 2, wherein electrical contacting of the swinging masses is effected via a polysilicon layer (buried contact paths or capacitor surfaces) buried in the substrate.

18. Acceleration sensor according to claim 2, wherein electrical contacting of the swinging masses is effected via buried, diffused zones in the substrate, diffused contact paths or diffused capacitor surfaces ("buried layer" contacting technique).

19. Acceleration sensor according to claim 2 wherein the length of the springs is short relative to the height of the springs.

20. Acceleration sensor according to claim 2 wherein there are two of said springs which extend radially and symetrically from the bearing point in opposite directions.

* * * * *